A. TREGONING.
HOSE NOZZLE.
APPLICATION FILED FEB. 17, 1910.
981,956.
Patented Jan. 17, 1911.
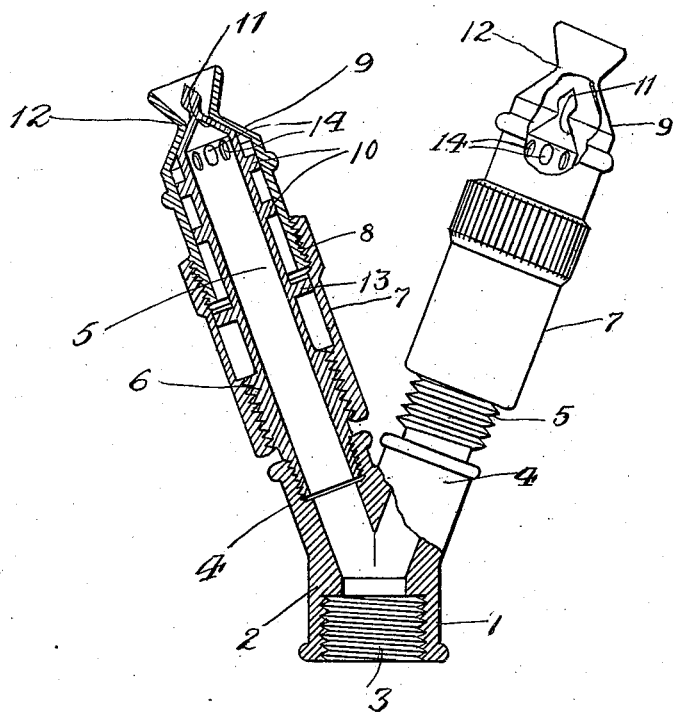
Witnesses
B. W. Pierce
Jay P. Harter
Inventor
Alfred Tregoning

UNITED STATES PATENT OFFICE.

ALFRED TREGONING, OF LOS ANGELES, CALIFORNIA.

HOSE-NOZZLE.

981,956.  Specification of Letters Patent.  Patented Jan. 17, 1911.

Application filed February 17, 1910. Serial No. 544,727.

*To all whom it may concern:*

Be it known that I, ALFRED TREGONING, a citizen of the United States, residing at Los Angeles, county of Los Angeles, State of California, have discovered a new and useful Improvement in Hose-Nozzles; and I do hereby declare the following to be a full, clear, and exact description of my invention, such as will enable others skilled in the art to which it appertains to make and use the same.

This invention relates to new and useful improvements in hose nozzles, and has for an object to provide a device of this character adapted to be used for the purpose of spraying trees and the like.

Another object of this invention is the provision of a nozzle of the character described, which will be comparatively simple and inexpensive to manufacture, reliable and efficient in use and readily operated.

With the above and other objects in view, this invention resides in the novel features of construction, combinations, formations and arrangements of parts to be hereinafter more particularly described, claimed and illustrated in the accompanying drawing, in which the figure is a sectional plan view of my improved nozzle.

Referring to the drawing by characters of reference, the numeral 1 designates generally my improved nozzle, comprising a shank 2, internally threaded as at 3, at one end for the reception of a hose or the like, and provided at its opposite end with a pair of diverging internally threaded extensions 4, adapted to receive the threaded reduced ends of the nozzles proper 5. At a point upon these nozzles adjacent the reduced threaded ends are formed threaded enlargements 6, adapted to receive one of the threaded ends of adjusting sleeves 7. The opposite ends of these adjusting sleeves are internally threaded, as at 8, for the reception of controlling sleeves 9, adapted to be longitudinally movable upon the nozzles 5, the said nozzles being formed upon their outer faces with annular ribs 10, adapted to contact with the inner faces of the said controlling sleeves 9 and hold the same thereon against any lateral movement. The outer extremities of the controlling sleeves 5 are provided with tapered closures 11, against which the contracted throats 12 of the controlling sleeves 9 are adapted to rest when the said sleeves are in their rearmost position. The controlling sleeves 9 are also provided with annular ribs 13, which are slightly larger than the ribs 10, for the purpose of contacting with the interior of the adjusting sleeves 7 and holding the same against any lateral play. The threads upon the interior of these sleeves 7, which are adapted to engage the threaded enlargements 6 of the nozzles 5 are slightly larger than the threads formed upon the opposite end, for a purpose to be hereinafter disclosed.

The operation of the device is as follows: After my improved nozzle has been applied to the hose and the water turned on, the sleeves 7 may be turned in a direction which will remove the contracted throats 12 from the tapered ends 11 of the nozzles, permitting the water to flow out through the apertures 14 formed in the outer extremities of the said nozzles adjacent their tapered ends, out through the contracted throats 12 and against the object to be sprayed. When, however, a finer adjustment is desired, the controlling sleeves 9 may be moved longitudinally upon the nozzles 5 within the adjusting sleeves 7, obviously reducing the spray a very slight degree, as desired.

From the foregoing disclosure it will be manifest that a nozzle is provided for which will fulfil all the necessary requirements of such a device.

Having thus fully described my invention, what I claim as new and desire to secure by Letters Patent is:

1. A device of the character described, comprising a shank provided with internally threaded diverging extensions, nozzles removably secured within said extensions, adjusting sleeves quick threaded for longitudinal movement upon said nozzles, controlling sleeves longitudinally movable upon the said nozzles and having a fine-threaded mounting within the adjusting sleeves, whereby the controlling sleeves may be given a quick or a fine adjustment, substantially as and for the purposes set forth.

2. In a device of the character described the combination of a shank provided with oppositely diverging internally threaded extensions, nozzles secured within said extensions and provided at a point adjacent their rear ends with threaded enlargements, adjusting sleeves threaded for longitudinal movement upon said enlargements, controlling sleeves threaded within the opposite ends of the adjusting sleeves and provided with contracted throats adapted to engage the outer tapered end of the said nozzles, for the purpose of controlling the flow of fluid therefrom, the threads upon the rear end of the adjusting sleeves being coarser than the threads formed upon the forward ends of the said sleeves, whereby a quick adjustment may be had by turning the adjusting sleeves, or a finer adjustment may be had by turning the controlling sleeves.

ALFRED TREGONING.

Witnesses:
B. W. PIERCE,
JAY P. HARTER.